(No Model.)
W. R. & T. H. DUNN.
BELT FASTENER.
No. 296,682.  Patented Apr. 8, 1884.
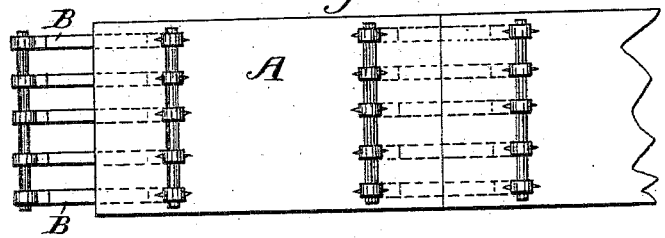
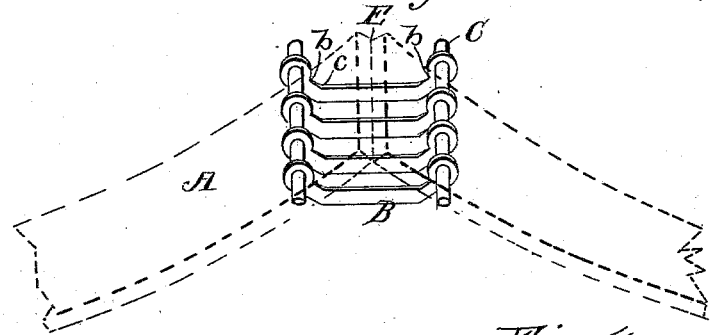
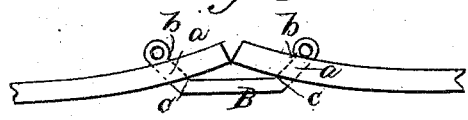
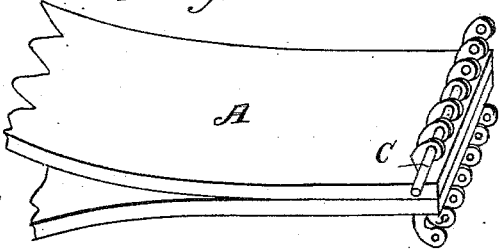
WITNESSES
W. E. Bowen
Geo. F. Harvey
INVENTOR
W. R. & T. H. Dunn
by Frank Sheehy
their Attorney

UNITED STATES PATENT OFFICE.

WILLIAM R. DUNN, OF ALTON, AND TEMPLE H. DUNN, OF CRAWFORDSVILLE, INDIANA.

BELT-FASTENER.

SPECIFICATION forming part of Letters Patent No. 296,682, dated April 8, 1884.

Application filed September 26, 1883. (No model.)

*To all whom it may concern:*

Be it known that we, WILLIAM R. DUNN and TEMPLE H. DUNN, citizens of the United States, residing, respectively, at Alton, in the county of Crawford and State of Indiana, and Crawfordsville, in the county of Montgomery and State of Indiana, have invented certain new and useful Improvements in Belt-Studs, of which the following is a description.

This invention has relation to improvements in belt-fasteners; and it consists in the peculiar construction of the fastening-bars, as will be hereinafter more fully set forth, and particularly pointed out in the claim appended.

Figure 1 is a plan view of two sections of a belt, showing our fastening devices applied. Fig. 2 is a longitudinal sectional view of two sections of a belt, showing the position of the fasteners during operation. Fig. 3 is a perspective view of our fasteners, showing their position with relation to the belt before the same is put under pressure. Fig. 4 shows the manner in which the fasteners are first applied to the belt-sections; and Fig. 5 is a side view of one of the fasteners with two sections of a belt slightly connected.

The invention has for its object to provide a cheap and simple means for fastening together the ends of belt-sections in such a manner that the fastening-bars will be let in the belt at the adjacent ends of each section, so as to bring the under surface of the horizontal portion of each connecting-bar on a line with the inner flat side of the belt next the pulleys, thus preventing any interruption in the travel of the belt. This object we accomplish by the peculiar formation of the connecting-bars, as shown in the accompanying drawings, and the application of which is more clearly illustrated in Fig. 2, which shows the position of the fasteners and belt when the latter is under pressure in operation.

The letter A indicates the belt-sections, B the fastening-bars, and C the locking-rods.

The fasteners B consist of a bar of iron or other suitable material, having a horizontal portion, M, and opposite outwardly-inclined or oblique arms or ends $a\ a$. These ends or arms have plain inner sides and incline from the horizontal portion M at an angle of about forty-five degrees. Thus it will be seen that the space between these inclined arms is much greater from their outer ends, or the points $b\ b$, than at their bases, or the points $c\ c$. By this construction it will be seen that after the connecting-bars have been inserted in the slits at the ends of the belt-sections, as shown in Fig. 4, and the transverse locking-rods C inserted in the eyes of each bar, respectively, the belt, when under pressure in operation, (the slits being of a sufficient distance from the ends, so as to have them meet,) will, by the inclination of the said ends $a\ a$ of connecting-bar, give the greatest frictional engagement at the ends of the belt-sections at the point E, thus causing the said ends of the belt to bulge or swell outward and the horizontal portion M to be brought on the line of resistance, occupying the space formed by the forcing outward of the ends $d\ d$ of the belt-sections, the whole assuming the position shown in Fig. 2.

The advantages of this construction are obvious. The inner surface of the belt being perfectly plain and smooth, without any elevation or interruption, it is allowed to pass smoothly over the pulleys, and is thereby not likely to jump.

We are aware that it is not new to construct a belt-fastener of bars having their ends curved to pass through slits in a belt; and provided with eyes for the reception of a locking-rod, and also that fasteners have been similarly constructed and provided with slots at their curved ends, to act as cams in forcing the locking-rod into the belt, so that the free ends of the belt-sections will be held in a vertical position, or nearly so, and the middle portion of the fasteners let in the belt, their inner sides not being flat or lying in a line with the inner side of the belt, and therefore do not claim either of these constructions; but,

Having thus described our invention, what we claim is—

As an improved article of manufacture, the belt-fastener herein described, consisting of the bars B, having the horizontal portion M and arms *a a*, projecting upward from the portion M at opposite ends on the angle specified, and provided with eyes for the reception of the locking-rods C C, the fasteners adapted, when applied to a belt under pressure, to bulge its adjacent ends outward by frictional engagement and occupy the space on the line of resistance formed thereby, so that the inner surface of the belt and the horizontal portion of the fasteners will be in line and run smoothly over the pulleys, substantially as and for the purposes set forth.

WILLIAM R. DUNN.
TEMPLE H. DUNN.

Witnesses:
W. R. HOLLCROFT,
JOHN T. HOLLCROFT.